United States Patent
Frea et al.

(10) Patent No.: US 12,522,191 B2
(45) Date of Patent: Jan. 13, 2026

(54) METHOD FOR DETERMINING A CAPACITY VALUE OF AT LEAST ONE SUPER-CAPACITOR OF AN ELECTROMECHANICAL BRAKING SYSTEM OF AT LEAST ONE VEHICLE, ELECTROMECHANICAL BRAKING SYSTEM, AND VEHICLE

(71) Applicant: FAIVELEY TRANSPORT ITALIA S.P.A., Turin (IT)

(72) Inventors: Matteo Frea, Turin (IT); Roberto Tione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 235 days.

(21) Appl. No.: 18/566,020

(22) PCT Filed: Jun. 3, 2022

(86) PCT No.: PCT/IB2022/055181
§ 371 (c)(1),
(2) Date: Nov. 30, 2023

(87) PCT Pub. No.: WO2022/254387
PCT Pub. Date: Dec. 8, 2022

(65) Prior Publication Data
US 2024/0270228 A1    Aug. 15, 2024

(30) Foreign Application Priority Data
Jun. 4, 2021   (IT) .................. 102021000014630

(51) Int. Cl.
*B60T 17/22*    (2006.01)
*B60T 8/88*     (2006.01)
*G01R 27/26*    (2006.01)

(52) U.S. Cl.
CPC ............ *B60T 17/228* (2013.01); *B60T 8/885* (2013.01); *G01R 27/2605* (2013.01);
(Continued)

(58) Field of Classification Search
CPC ........ G01R 27/00; G01R 27/02; G01R 27/26; G01R 27/2605; B60T 8/00; B60T 8/17;
(Continued)

(56) References Cited

U.S. PATENT DOCUMENTS 6,362,632 B1 *   3/2002   Livingston ............ G01F 23/266
                                              73/304 C
2021/0231714 A1 *   7/2021   Fourmont .............. H02H 3/247

FOREIGN PATENT DOCUMENTS

CN    110435627 A  * 11/2019   ............ G01B 7/082
CN    110957774 A    4/2020
(Continued)

OTHER PUBLICATIONS

ISA European Patent Office, International Search Report Issued in Application No. PCT/IB2022/055181, Sep. 8, 2022, WIPO, 2 pages.

*Primary Examiner* — Hoai-An D. Nguyen
(74) *Attorney, Agent, or Firm* — K&L Gates LLP (57) ABSTRACT

A method is described for determining a capacitance value of at least a first super-capacitor of an electro-mechanical braking system which also comprises a second super-capacitor. The method comprises:
  a) measuring a first voltage value at terminals of the second super-capacitor;
  b) if the first voltage value is greater than a minimum voltage value, charging or discharging the first super-capacitor, in order to make the terminals of the first super-capacitor assume a second voltage value;
  c) determining a first voltage variation at the terminals of the first super-capacitor;

(Continued)

d) determining a first voltage variation rate;
e) measuring a first current value flowing in one of the terminals of the first super-capacitor;
f) calculating the capacitance value of the first super-capacitor by means of the ratio between the first measured current value and the first voltage variation rate.

An electro-mechanical braking system and a vehicle are also described.

20 Claims, 4 Drawing Sheets

(52) U.S. Cl.
CPC ... *B60T 2270/406* (2013.01); *B60T 2270/413* (2013.01); *B60T 2270/414* (2013.01)

(58) Field of Classification Search
CPC . B60T 8/171; B60T 8/32; B60T 8/321; B60T 8/3235; B60T 8/88; B60T 8/885; B60T 13/00; B60T 13/74; B60T 17/00; B60T 17/18; B60T 17/22; B60T 17/228; B60T 2270/00; B60T 2270/40; B60T 2270/406; B60T 2270/413; B60T 2207/414; B60Y 2306/00; B60Y 2306/13; B60Y 2400/00; B60Y 2400/81
USPC ...................................................... 324/76.11
See application file for complete search history.

(56) References Cited

FOREIGN PATENT DOCUMENTS

| | | | | | |
|---|---|---|---|---|---|
| CN | 111474412 | A | * | 7/2020 | ............... G01D 5/24 |
| CN | 111771269 | A | * | 10/2020 | ............. H01L 23/66 |
| CN | 113504422 | A | * | 10/2021 | ........... G01R 31/003 |
| EP | 1637422 | A1 | | 3/2006 | |
| WO | 2021047910 | A1 | | 3/2021 | |

* cited by examiner

METHOD FOR DETERMINING A CAPACITY VALUE OF AT LEAST ONE SUPER-CAPACITOR OF AN ELECTROMECHANICAL BRAKING SYSTEM OF AT LEAST ONE VEHICLE, ELECTROMECHANICAL BRAKING SYSTEM, AND VEHICLE

CROSS REFERENCE TO RELATED APPLICATIONS

The present application is a U.S. National Phase of International Application No. PCT/IB2022/055181 entitled "METHOD FOR DETERMINING A CAPACITY VALUE OF AT LEAST ONE SUPER-CAPACITOR OF AN ELECTROMECHANICAL BRAKING SYSTEM OF AT LEAST ONE VEHICLE, ELECTROMECHANICAL BRAKING SYSTEM, AND VEHICLE," and filed on Jun. 3, 2022. International Application No. PCT/IB2022/055181 claims priority to Italian Patent Application No. 102021000014630 filed on Jun. 4, 2021. The entire contents of each of the above-listed applications are hereby incorporated by reference for all purposes.

TECHNICAL FIELD

This invention generally lies within the field of methods and braking systems for vehicles; in particular, the invention relates to a method for determining a capacitance value of at least a first super-capacitor of an electro-mechanical braking system of at least one vehicle, an electro-mechanical braking system, and a vehicle comprising this electro-mechanical braking system.

PRIOR ART

Nowadays, new electro-mechanical braking systems based on mechatronic technology, for example for railway applications, are being developed. Their design must functionally replicate that which was previously provided by a generic electro-pneumatic brake, for example for railway applications, especially with regard to safety-related functions. In these new electro-mechanical braking systems, it is therefore necessary to ensure that:

an amount of energy is stored which is capable of ensuring at least one emergency braking action;
the emergency braking at the whole vehicle level reaches a predetermined minimum safety level.

For example, the braking systems are usually provided with an energy storage means which is arranged to store an amount of energy sufficient to cause the electro-pneumatic braking system to perform at least one complete emergency braking action.

Depending on the type of braking system, the energy storage means may take various forms. For pneumatic braking systems, this energy storage means may traditionally be an auxiliary tank, for example. In this case, the energy is stored by means of storing compressed air in this auxiliary tank, and the volume of the auxiliary tank is taken as certain and invariable. In order to satisfy the necessary safety requirements, the internal pressure in the auxiliary tank is usually measured continuously, by means of one or more pressure sensors (in order to satisfy any redundancy requirements).

By monitoring the pressure inside the auxiliary tank, it is possible to immediately identify any loss in the stored energy that is required for performing emergency braking, and optionally promptly intervene in order to restore safety.

In electro-mechanical braking systems, however, the energy storage means may be, for example, a mechanical means for storing mechanical potential energy. The mechanical means may be a helical spring, for example. The mechanical means for storing mechanical potential energy may clearly perform the same function as that performed by the auxiliary tank described above, which is that of storing the energy required to apply at least one emergency braking action.

Again, in order to satisfy the necessary safety requirements, it is also possible, by means of suitable sensors, to monitor the mechanical energy stored in the mechanical means for storing mechanical potential energy.

Again, by monitoring the energy stored in the mechanical means for storing mechanical potential energy, it is possible to immediately identify any loss in the stored energy that is required for performing emergency braking, and optionally promptly intervene in order to restore safety.

Other forms of mechanical energy storage may clearly also be used, such as, by way of non-exclusive example, a flat spiral spring, in cases where the transfer of forces is rotational rather than translational.

In a further example, the stored energy may be kinetic energy and may be stored in a flywheel which is kept in adequate rotation by an electric motor. Again, in order to satisfy safety requirements, it is possible to monitor the stored kinetic energy by means of suitable sensors. By monitoring the kinetic energy stored in the mechanical means for storing kinetic energy, it is possible to immediately identify any loss in the stored kinetic energy that is required for performing emergency braking, and optionally promptly intervene in order to restore safety. In yet a further example, the energy storage means of an electro-mechanical braking system may be an electrical energy storage means, for example a super-capacitor. In this case, an energy charger may transfer energy from a supply source to said super-capacitor. According to that which has been described above, the super-capacitor performs the same function as that performed by the auxiliary tank, which is that of storing the electrical energy required to apply at least one emergency braking action.

The energy stored in a super-capacitor is:

$$\text{energy} = \frac{1}{2} * C * V^2,$$

where C is the capacitance and V is the voltage.

Therefore, in order to be able to monitor the actual presence of sufficient energy to brake, it is necessary to monitor the voltage across the capacitor and the capacitance thereof. However, with regard to the capacitance, a super-capacitor usually has a nominal capacitance value that is indicative of the amount of electrical energy that may be stored therein. Disadvantageously, a super-capacitor is subject to wear and, over the course of its use, experiences a gradual reduction in its capacitance. This wear may even reach levels which would no longer allow said super-capacitor to store an amount of electrical energy sufficient to cause complete emergency braking to be performed.

In order to measure the capacitance of the super-capacitor, the prior art discloses systems and methods which require the availability of energy stored in the super-capacitor to be changed, which temporarily compromises the ability to perform emergency safety braking.

SUMMARY OF THE INVENTION

The object of this invention is therefore that of providing a solution that makes it possible to monitor the residual capacitance of a super-capacitor of an electro-mechanical braking system of at least one vehicle without temporarily compromising the ability to perform emergency safety braking, so as to further increase the safety level of the electro-mechanical braking system.

The aforesaid and other objects and advantages are achieved, according to one aspect of the invention, by a method for determining a capacitance value of at least a first super-capacitor of an electro-mechanical braking system of at least one vehicle, which method has the features defined in claim 1.

The aforesaid and other objects and advantages are achieved, according to a further aspect of the invention, by an electro-mechanical braking system for at least one vehicle, which system has the features defined in claim 13.

The aforesaid and other objects and advantages are achieved, according to yet a further aspect of the invention, by a vehicle which has the features defined in claim 20.

Preferred embodiments of the invention are defined in the dependent claims, the content of which is to be understood as an integral part of the present description.

BRIEF DESCRIPTION OF THE DRAWINGS

The functional and structural features of some preferred embodiments of a method for determining a capacitance value of a super-capacitor of an electro-mechanical braking system of at least one vehicle, an electro-mechanical braking system, and a vehicle according to the invention will now be described. Reference is made to the accompanying drawings, in which.

DETAILED DESCRIPTION

Before explaining in detail a plurality of embodiments of the invention, it should be clarified that the invention is not limited in its application to the design details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and the variations thereof are intended to cover the elements set out below and their equivalents, as well as additional elements and the equivalents thereof.

Figure 1:
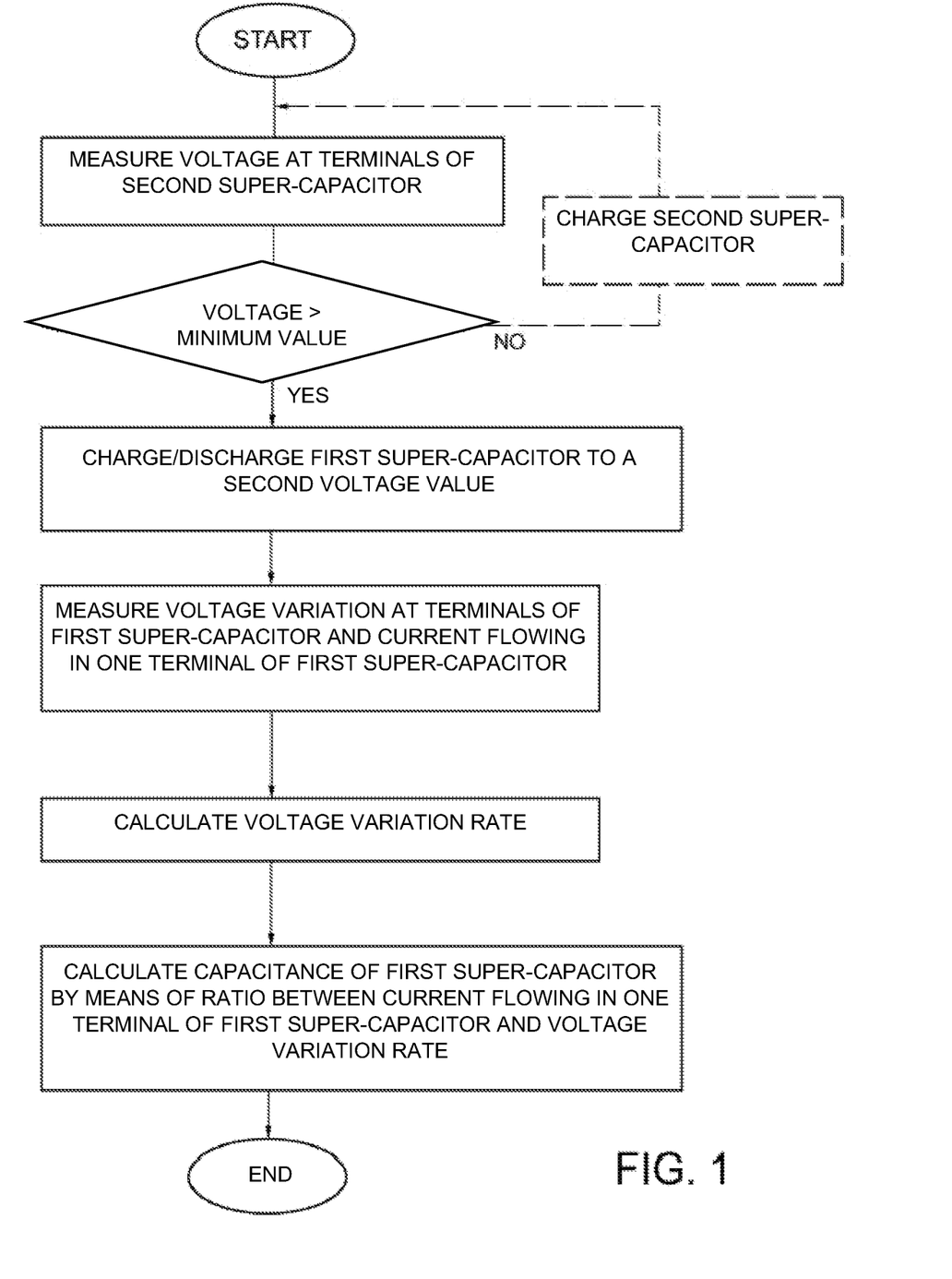
FIG. 1 is a first flow chart showing an embodiment of a method for determining a residual capacitance value of at least a first emergency super-capacitor of an electro-mechanical braking system of at least one railway vehicle according to the invention.

With reference, by way of example, to FIG. 1, the following describes a first embodiment of a method for determining a capacitance value of at least a first super-capacitor 100 of an electro-mechanical braking system 102 of at least one vehicle. The electro-mechanical braking system 102 also comprises a second super-capacitor 101. In particular, the first super-capacitor 102 is arranged to store a first amount of electrical energy sufficient to cause the electro-mechanical braking system 102 to perform at least one emergency braking action, and the second super-capacitor 101 is arranged to store a second amount of electrical energy sufficient to cause the electro-mechanical braking system 102 to perform said at least one emergency braking action.

In a first embodiment, the method comprises the steps of:
a) measuring a first voltage value at terminals of said second super-capacitor 101;
b) if said first voltage value is greater than a predetermined minimum voltage value, performing a charge or discharge action of said first super-capacitor 100 for a first measurement time period, wherein said charge or discharge action is arranged to make said terminals of said first super-capacitor 100 assume a second voltage value;
c) determining a first voltage variation at the terminals of said first super-capacitor 100 during said first measurement time period;
d) determining a first voltage variation rate on the basis of the first voltage variation at the terminals of said first super-capacitor 100 determined in step c) and a duration of time of said first measurement time period;
e) measuring a first current value flowing in one of said terminals of said first super-capacitor 100, at a first measurement instant of said first measurement time period;
f) calculating the capacitance value of said first super-capacitor 100 by means of the ratio between said first current value measured at said first measurement instant and said first voltage variation rate.

In other words, it is possible to monitor the voltage across the second super-capacitor 101, in order to verify that this voltage is greater than a predetermined minimum voltage value. This minimum voltage value may be determined as a value which indicates the fact that the energy stored in the second super-capacitor 101 is sufficient for performing emergency braking if required. Once it has been verified that the second super-capacitor 101 is sufficiently charged to be able to perform the emergency braking action, it is possible to charge or discharge the first super-capacitor 100 for a measurement time period. This charge or discharge action is arranged to be able to make the terminals of said super-capacitor assume a second voltage value. With a second super-capacitor sufficiently charged as a back-up for performing emergency braking if required, this second voltage value may be either greater than or equal to or less than said minimum voltage value at said terminals of said first super-capacitor 101. During said measurement time period in which the charge or discharge action takes place, it is possible to determine, for example by means of measuring, the voltage variation at the terminals of the first super-capacitor 100. For example, if, at the beginning, the voltage across the first super-capacitor is 50V and, at the end of the discharge action, the voltage across the super-capacitor is 40V, the voltage variation at the terminals of the first super-capacitor is 10V. However, if, at the beginning, the voltage across the first super-capacitor is 50V and, at the end of the charge action, the voltage across the first super-capacitor is 55V, for example, the voltage variation at the terminals of the super-capacitor is 5V.

Once the voltage variation at the terminals of the first super-capacitor 100 has been determined, it is possible to determine a voltage variation rate, also known as a voltage variation speed, on the basis of the voltage variation at the terminals of the first super-capacitor and the duration of time of the measurement time period. It is also possible to measure a current value flowing in one of the terminals of the first super-capacitor, at a measurement instant of the measurement time period. The measured current value flowing in one of the terminals of the first super-capacitor, during a charge action experienced by the super-capacitor, may be an absorption current entering the terminal of the super-capacitor, or, during a discharge action experienced by the super-capacitor, may be a current emitted out of the terminal of the super-capacitor.

For example, the measurement instant may be the instant immediately after the start instant of the measurement time period, or the instant immediately preceding the end instant of the measurement time period, or any instant between the instant immediately after the start instant of the measurement time period and the instant immediately preceding the end instant of the measurement time period. The current value flowing in one of the terminals of the super-capacitor may also be measured at a plurality of measurement instants of the measurement time period.

Lastly, it is possible to calculate the capacitance value of the first super-capacitor by means of the ratio between said first current value measured at said measurement instant and said first voltage variation rate. For example, it is possible to apply the following equation:

$$i = c * dv/dt \rightarrow c = i/(dv/dt)$$

where i is the first current value flowing in one of the terminals of the first super-capacitor, at a measurement instant of the measurement time period, c is the capacitance of the first super-capacitor, and dv/dt is the voltage variation rate (i.e. the derivative over time of the voltage across the first super-capacitor). This may also be analogously applied to the second super-capacitor.

For example, with reference to the field of railway vehicles, emergency braking is braking which results in at least one railway vehicle stopping or decelerating to walking pace. Emergency braking may be automatically activated, for example, if a situation of potential danger is detected by at least one system of the railway vehicle. The prior art will be analyzed with particular reference to the field of railway vehicles.

Within the railway sector, reference may be made to the following European standards:
EN50126 ["Railway applications. The specification and demonstration of reliability, availability, maintainability and safety (RAMS).
EN50128 ["Railway applications. Communications, signalling and processing systems. Software for railway control and protection systems"]:
EN50129 ["Railway applications. Communication, signaling and processing systems. Safety related electronic systems for signalling"].
EN50159 ["Railway applications. Communication, signaling and processing systems. Safety-related communication in transmission systems"].

In particular, standard EN50126 defines the methodologies for assigning the safety levels SIL0/1/2/3/4 (with safety level SIL4 indicating the maximum safety level) to the subsystems making up the system in question, based on the results of the safety analysis, and standards EN50128 and EN50129 define the design criteria to be applied to the software and hardware components respectively on the basis of the SIL levels assigned based on said safety analysis results. The systems involved in braking are usually required to have a safety level SIL=4. With reference instead of the field of road vehicles, emergency braking may be braking, in accordance with the required NCAPs relating to emergency braking, which allows the road vehicle to be stopped or decelerated in order to protect pedestrians or prevent impending accidents with vehicles.

Step a), i.e. measuring a first voltage value at the terminals of said second super-capacitor 101, may preferably be carried out when the second super-capacitor 101 is not undergoing a charge action. In so doing, the measurement would not be influenced by any charging voltage applied to the terminals of the second super-capacitor in order to charge it.

Step d), i.e. determining a first voltage variation rate on the basis of the first voltage variation at the terminals of said first super-capacitor 100 determined in step c) and a duration of time of said first measurement time period, may preferably comprise:
determining the first voltage variation rate by means of the ratio between the first voltage variation determined in step c) and said duration of time of said first measurement time period.

For example, if the voltage variation at the terminals of the first super-capacitor is 10V and the measurement time period lasts 2s, the first voltage variation rate is 5V/s.

The method for determining a capacitance value of at least a first super-capacitor may preferably also comprise the steps of:
a') measuring a third voltage value at terminals of said first super-capacitor 100;
b') if said third voltage value is greater than said predetermined minimum voltage value, performing a charge or discharge action of said second super-capacitor 101 for a second measurement time period, wherein said charge or discharge action is arranged to make said terminals of said second super-capacitor 101 assume a fourth voltage value;
c') determining a second voltage variation at the terminals of said second super-capacitor (101) during said second measurement time period;
d') determining a second voltage variation rate on the basis of the second voltage variation at the terminals of said second super-capacitor (101) determined in step c') and a duration of time of said second measurement time period;
e') measuring a second current value flowing in one of said terminals of said second super-capacitor (101), at a second measurement instant of said second measurement time period;
f) calculating the capacitance value of said second super-capacitor (101) by means of the ratio between said second current value measured at said second measurement instant and said second voltage variation rate.

In other words, it is not only possible to measure the capacitance of the first super-capacitor, but it is also possible to measure the capacitance of the second super-capacitor.

Step a') may preferably be carried out when the first super-capacitor 100 is not undergoing a charge action. In so doing, the measurement would not be influenced by any charging voltage applied to the terminals of the first super-capacitor in order to charge it.

Step d') may preferably comprise:
  determining the second voltage variation rate by means of the ratio between the second voltage variation determined in step c') and said duration of time of said second measurement time period.

For example, if the voltage variation at the terminals of the second super-capacitor is 10V and the measurement time period lasts 2s, the second voltage variation rate is 5V/s.

The first measurement time period and the second measurement time period are preferably equal. In other words, the measurement time applied for measuring the capacitance of the first super-capacitor and the measurement time applied for measuring the capacitance of the second super-capacitor may be the same.

The method for determining a capacitance value of at least a first super-capacitor may preferably also comprise the step of:
  comparing the calculated capacitance value of said first super-capacitor 100 with a first predetermined minimum capacitance threshold.

For example, the minimum capacitance threshold may be determined on the basis of a maximum allowed wear value, beyond which the first super-capacitor is no longer able to store sufficient energy to perform emergency braking.

When the comparison shows that the calculated capacitance value of the first super-capacitor 100 is less than the first predetermined minimum capacitance threshold, the method may preferably also comprise the step of:
  sending a first maintenance request or alarm signal to a remote control station; and/or
  operating a first signaling means arranged in a control cabin of the vehicle; and/or
  transmitting a first error message to a control unit of the vehicle;
  preventing the release of the braking force generated by the electro-mechanical braking system.

In the railway sector, for example, a control means, e.g. a train control unit (BCU), may communicate with the control unit of the vehicle, i.e. a central train control unit (TCMS). The communication may occur via various means of communication, for example hardware or bus networks (ethernet, CAN, MVB, etc. . . . ).

In other words, if excessive consumption of the first super-capacitor is detected, it is possible to intervene, for example by sending a first maintenance request or alarm signal to the remote control station, and/or by operating a first signaling means arranged in a control cabin of the vehicle, and/or by transmitting an error message to a control unit of the vehicle, and/or by preventing the release of the braking force generated by the electro-mechanical braking system.

For example, the first signaling means may be visual or audible, e.g. an indicator light, an LED, a display, a loudspeaker, or the like.

The method for determining a capacitance value of at least a first super-capacitor may preferably also comprise the step of:
  comparing the calculated capacitance value of said second super-capacitor 101 with a second predetermined minimum capacitance threshold.

The first predetermined minimum capacitance threshold and the second predetermined minimum capacitance threshold may preferably be equal.

When the comparison shows that the calculated capacitance value of the second super-capacitor 101 is less than the second predetermined minimum capacitance threshold, the method may preferably also comprise the step of:
  sending a second maintenance request or alarm signal to said remote control station; and/or
  operating said first signaling means arranged in said control cabin of the vehicle or a second signaling means arranged in said control cabin of the vehicle;
  transmitting a second error message to the control unit of the vehicle;
  preventing the release of the braking force generated by the electro-mechanical braking system.

For example, the second signaling means may also be visual or audible, e.g. an indicator light, an LED, a display, a loudspeaker, or the like.

In a further aspect, this invention relates to an electro-mechanical braking system for at least one vehicle.

Figure 2:
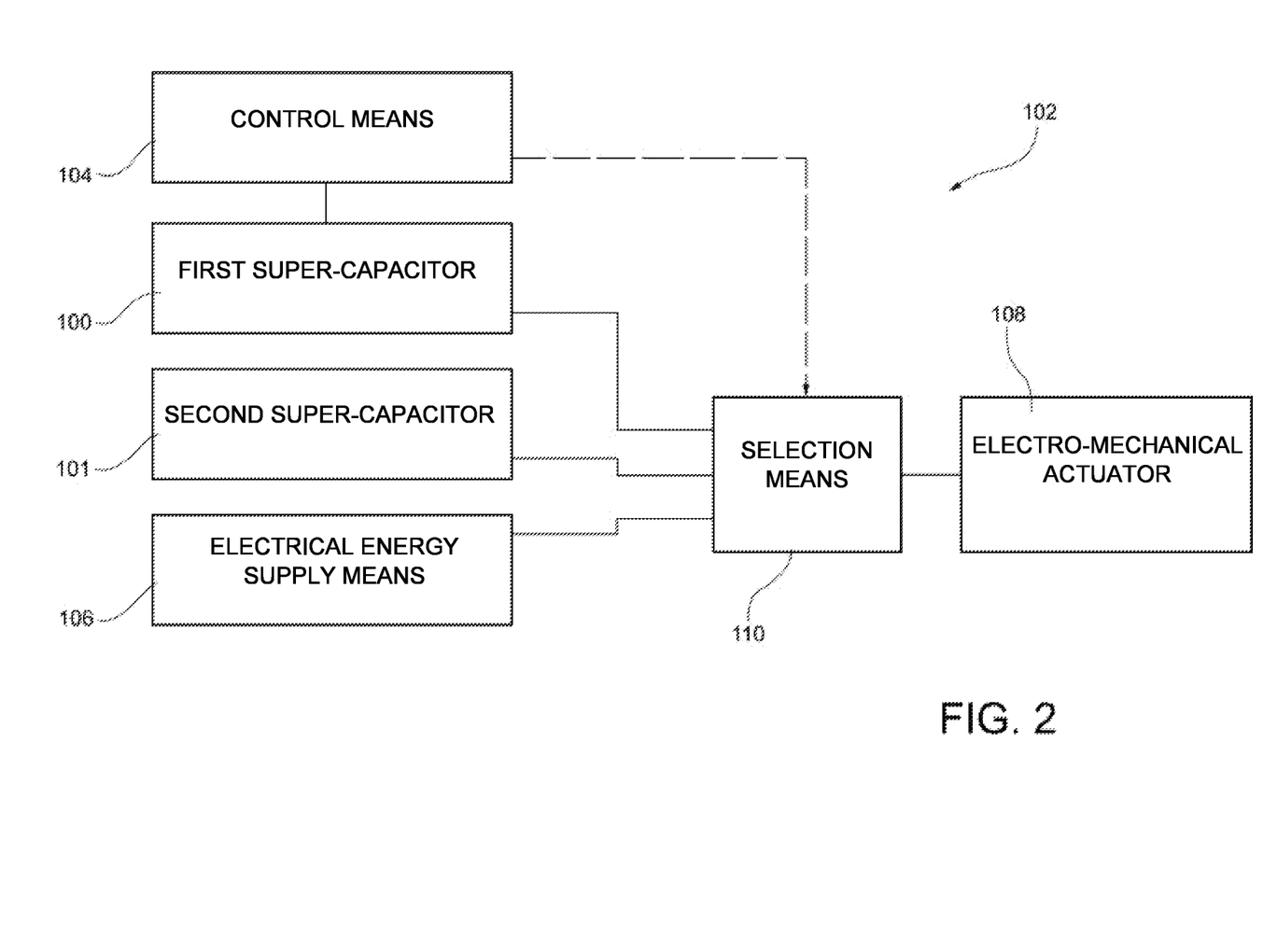
FIG. 2 shows a first embodiment of an electro-mechanical braking system comprising a first super-capacitor and a second super-capacitor.

With reference, by way of example, to FIG. 2, the following describes a first embodiment of an electro-mechanical braking system.

In this first embodiment, the electro-mechanical braking system may comprise:
  a first super-capacitor 100 arranged to store a first amount of electrical energy sufficient to cause the electro-mechanical braking system 102 to perform at least one emergency braking action;
  a second super-capacitor 101 arranged to store a second amount of electrical energy sufficient to cause the electro-mechanical braking system 102 to perform said at least one emergency braking action;
  a control means 104 arranged to carry out a method for determining a capacitance value of a first super-capacitor according to any one of the embodiments described above. For example, the control means 104 may be a controller, a microcontroller, an electronic control unit, a control unit, a control module, a PLC, or the like.

For example, the control means may directly include timing means (e.g. timers) and/or means for measuring current (e.g. current sensors) and/or means for measuring voltage (e.g. voltage sensors), or may receive data from timing means and/or means for measuring current and/or means for measuring voltage that are external to said control means and coupled to the respective elements of the electro-mechanical braking system, in order to have available the various voltage, current and time data for carrying out the method for determining a capacitance value of a super-capacitor, e.g. at least the first voltage value at terminals of said second super-capacitor, the second voltage value at the terminals of the first super-capacitor, the first voltage variation, the duration of time of said first measurement time period, the first current value flowing in one of said terminals of said first super-capacitor, etc. . . .

The electro-mechanical braking system may preferably be arranged to receive at least part of a third amount of energy from an electrical energy supply means 106 of said vehicle. For example, the electrical energy supply means 106 may be the battery of the vehicle.

The electro-mechanical braking system may also comprise:

an electro-mechanical actuator 108 arranged to receive electrical energy and convert it into a braking force;

at least one selection means 110 arranged to receive at least part of the first amount of electrical energy stored in said first super-capacitor, at least part of the second amount of electrical energy stored in said second super-capacitor, and at least part of the third amount of electrical energy stored in the electrical energy supply means 106, and selectively supply at least part of the first amount of electrical energy stored in said first super-capacitor or at least part of the second amount of electrical energy stored in said second super-capacitor or at least part of the third amount of electrical energy stored in the electrical energy supply means 106 to the electro-mechanical actuator.

In other words, for example, the selection means 110 may receive at least part of the first amount of electrical energy stored in said first super-capacitor, at least part of the second amount of electrical energy stored in said second super-capacitor, and at least part of the second amount of electrical energy stored in the battery of the vehicle, in order to selectively deliver said energy to the electro-mechanical actuator.

The first super-capacitor 100 and the second super-capacitor 101 may preferably be arranged electrically in parallel with each other.

When the electro-mechanical braking system 102 receives a request to perform braking, the at least one selection means 110 may preferably be arranged to selectively:

supply to the electro-mechanical actuator at least part of the third amount of electrical energy stored in the electrical energy supply means 106 if the voltage at the terminals of the electrical energy supply means 106 is greater than the minimum voltage value.

In other words, when the braking system receives a request to perform braking, the at least one selection means may preferably be arranged to provide the electro-mechanical actuator with at least part of the first amount of electrical energy stored in the first super-capacitor if the voltage at the terminals of the supply means (e.g. the battery of the vehicle), which voltage is indicative of the energy stored in the battery, is less than said minimum voltage value, i.e. is not able to perform emergency braking, but the voltage at the terminals of the first super-capacitor, which voltage is indicative of the energy stored in the first super-capacitor, is greater than said minimum voltage value.

Alternatively, when the braking system receives a request to perform braking, the at least one selection means may be arranged to provide the electro-mechanical actuator with at least part of the second amount of electrical energy stored in the second super-capacitor if the voltage at the terminals of the supply means (e.g. the battery of the vehicle), which voltage is indicative of the energy stored in the battery, is less than said minimum voltage value, i.e. is not able to perform emergency braking, and the voltage at the terminals of the first super-capacitor, which voltage is indicative of the energy stored in the first super-capacitor, is less than said minimum voltage value, i.e. is not able to perform emergency braking.

Alternatively, when the braking system receives a request to perform braking, the at least one selection means is arranged to provide the electro-mechanical actuator with at least part of the third amount of electrical energy stored in said electrical energy supply means 106 (e.g. the battery of the vehicle) if the voltage at the terminals of said supply means 106 is greater than said minimum voltage value, i.e. is able to perform emergency braking.

The control means may preferably be arranged to receive a signal indicative of the voltage value at the terminals of said electrical energy supply means 106 (e.g. the battery of the vehicle). When the voltage value at the terminals of the electrical energy supply means 106 is less than said minimum voltage value, the control means may also be arranged to, via the selection means:

provide the electro-mechanical actuator with at least part of the first amount of electrical energy stored in the first super-capacitor, and/or provide the electro-mechanical actuator with at least part of the second amount of electrical energy stored in the second super-capacitor.

In other words, when the control means detects that the battery of the vehicle has failed, or when the battery of the vehicle is too used or damaged, said control means may actuate the selection means to provide the electro-mechanical actuator with at least part of the first amount of electrical energy stored in the first super-capacitor and/or part of the second amount of electrical energy stored in the second super-capacitor in order to perform automatic braking.

Figure 3:
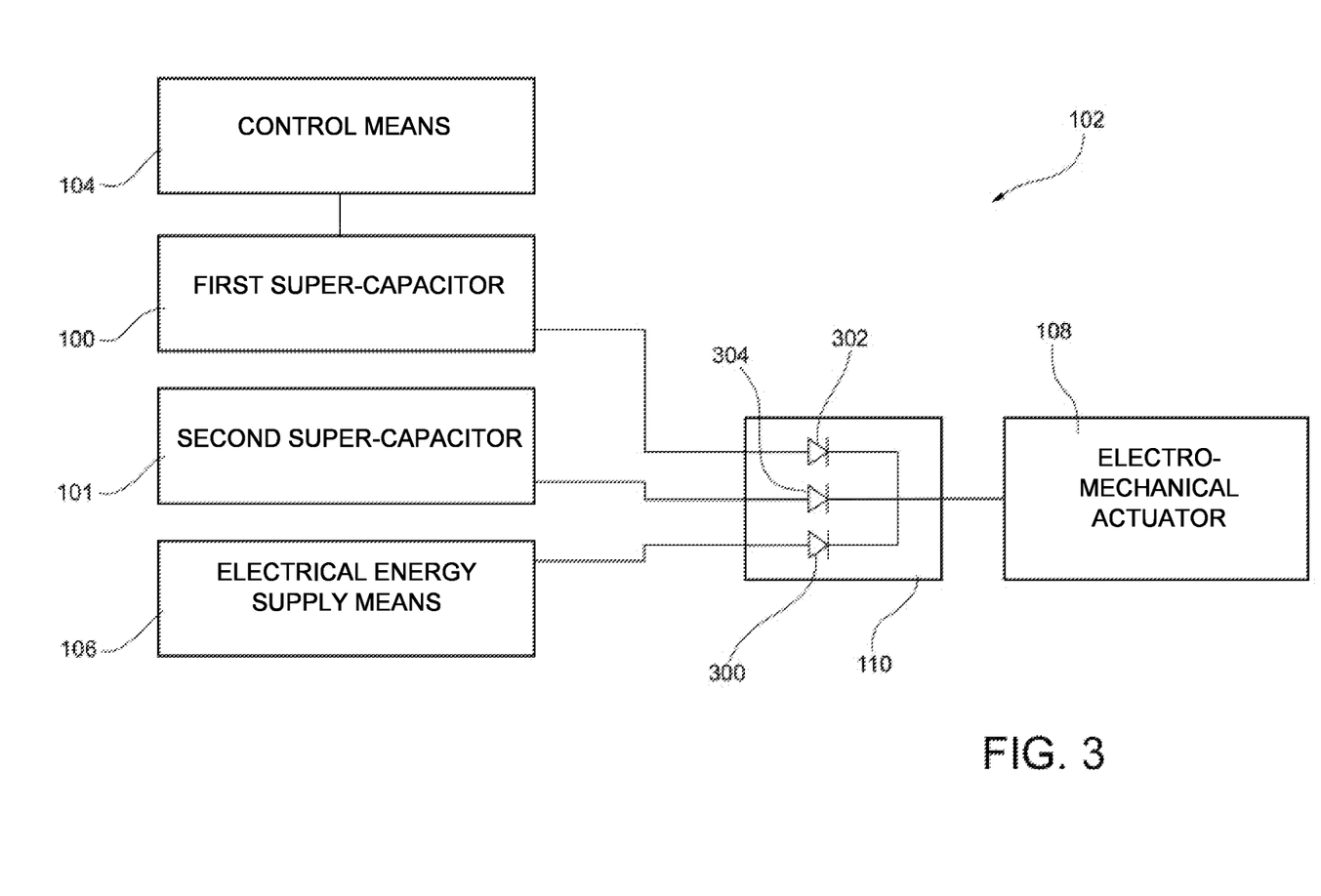
FIG. 3 shows a second embodiment of an electro-mechanical braking system comprising a first super-capacitor and a second super-capacitor.

With reference to FIG. 3, the selection means may preferably include at least:

a first diode 300 connected between the electrical energy supply means 106 and the electro-mechanical actuator, a second diode 302 connected between the first super-capacitor 100 and the electro-mechanical actuator 108, and a third diode 304 connected between the second super-capacitor 101 and the electro-mechanical actuator 108.

Figure 4:
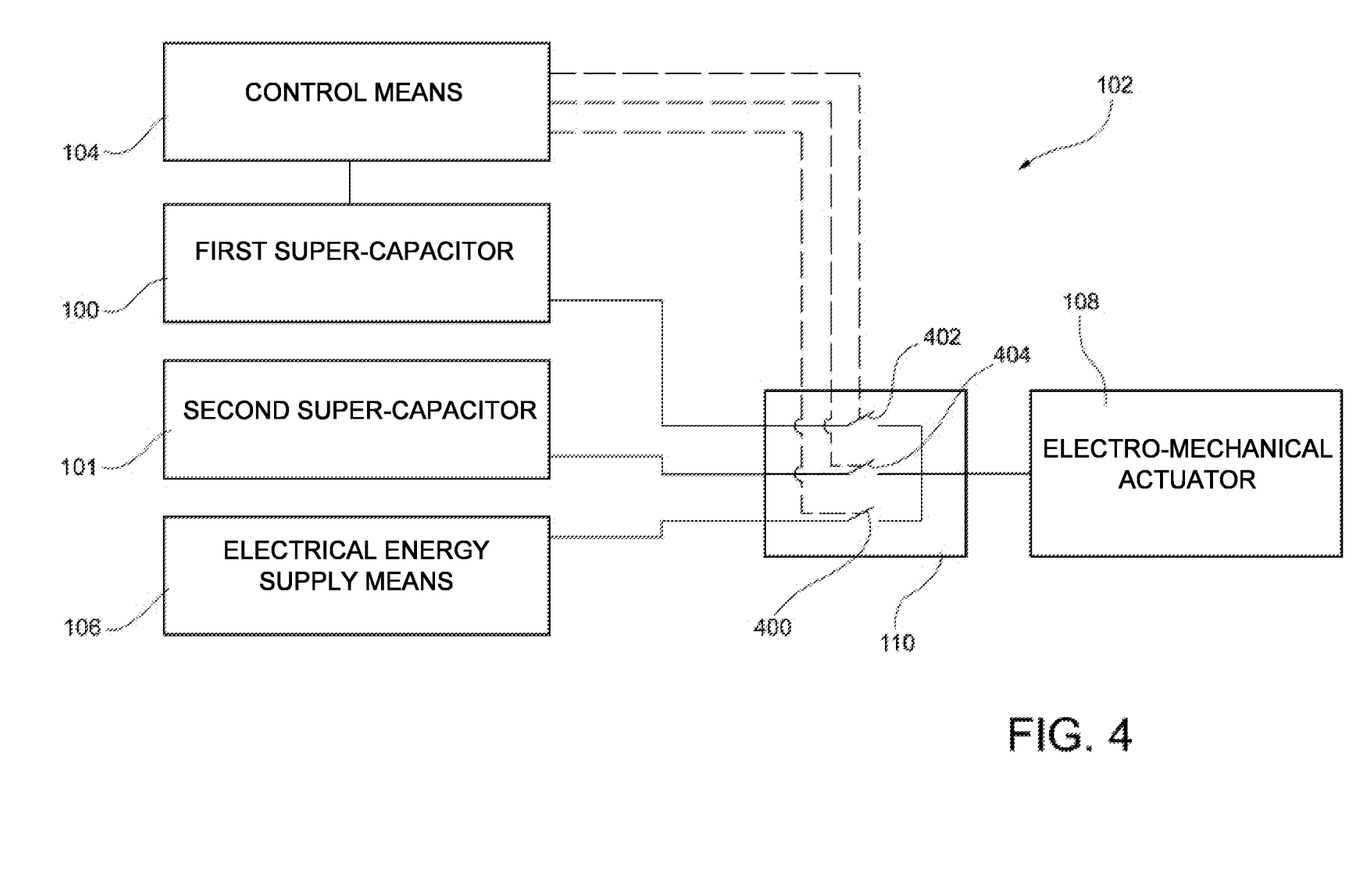
FIG. 4 shows a second embodiment of an electro-mechanical braking system comprising a first super-capacitor and a second super-capacitor.

Alternatively, with reference to FIG. 4, the selection means may include at least:

a first switching means 400 connected between the electrical energy supply means 106 and the electro-mechanical actuator, a second switching means 402 connected between the first super-capacitor 100 and the electro-mechanical actuator 108, and a third switching means 400 connected between the second super-capacitor 101 and the electro-mechanical actuator 108.

For example, each switching means may be a switch which is arranged such that it may be switched by said control means.

The electro-mechanical braking system may preferably comprise:

a communication means arranged to send said first maintenance request or alarm signal to a remote control station and/or said second maintenance request or alarm signal to a remote control station and/or said first error message to the control unit of the vehicle and/or said second error message to the control unit of the vehicle;

and/or at least a first signaling means arranged in a control cabin of the vehicle;

a means for preventing the release of the braking force generated by the electro-mechanical braking system.

Below are some embodiments of electro-mechanical braking systems.

The following describes a possible embodiment of an electro-mechanical braking system comprising a first super-capacitor and a second super-capacitor. For example, the electro-mechanical braking system is arranged to be installed on at least one railway vehicle. This electro-mechanical braking system comprises at least a first emergency super-capacitor arranged to store first electrical energy and a second emergency super-capacitor arranged to store second electrical energy. In this case, the first electrical energy stored in the first super-capacitor and the second electrical energy stored in the second super-capacitor, when each provided to an electro-mechanical assembly of the braking system, may each be sufficient for activating the electro-mechanical assembly to generate a braking force suitable for causing the braking system to perform at least one emergency braking action.

For example, the electro-mechanical assembly may include an electric motor, by means of operating which it is possible to regulate the braking force generated by the electro-mechanical assembly. The braking system may also include a control means, a first connection means, and a second connection means.

The control means may be arranged to selectively connect or disconnect the first emergency super-capacitor to/from the electric motor, via said first connection means, so as to selectively provide the electrical energy stored in the first emergency super-capacitor to the electric motor.

The control means may be arranged to selectively connect or disconnect the second emergency super-capacitor to/from the electric motor, via said second connection means, so as to selectively provide the electrical energy stored in the second emergency super-capacitor to the electric motor.

The electric motor may be arranged to activate when it receives said electrical energy from the first super-capacitor or from the second super-capacitor, so as to make the electro-mechanical assembly generate the braking force suitable for causing the braking system to perform the at least one emergency braking action.

For example, when the first emergency super-capacitor has to store electrical energy, the control means may be arranged to connect the first super-capacitor to a battery of the at least one railway vehicle. As an alternative or in addition, the control means may be arranged to connect the first emergency super-capacitor to an electrical energy recovery system that is comprised in or associated with the braking system. The electrical energy recovery system may be arranged to recover electrical energy while the electro-mechanical assembly is applying a braking force.

For example, when instead the second emergency super-capacitor has to store electrical energy, the control means may be arranged to connect the second super-capacitor to a battery of the at least one railway vehicle. As an alternative or in addition, the control means may be arranged to connect the second emergency super-capacitor to the electrical energy recovery system that is comprised in or associated with the braking system.

For example, the electro-mechanical assembly may include:
  a transmission shaft rotatably connected to the electric motor;
  a linear actuator capable of extending from a retracted position in which two ends of the linear actuator are at a first distance dis1, to an extended position in which said ends of the linear actuator are at a second distance dis2 that is greater than the first distance dis1;
  a transmission mechanism arranged between the transmission shaft and the linear actuator, wherein the transmission mechanism may be arranged to convert the rotary motion of the transmission shaft into a linear motion of the linear actuator.

For example, the electric motor may be arranged to:
cause the transmission shaft to rotate in a first direction d1, the rotation of the transmission shaft in the first direction d1 causing the distance between the two ends of the linear actuator to increase;
cause the transmission shaft to rotate in a second direction d2 opposite to said first direction d1, the rotation of the transmission shaft in the second direction d2 causing the distance between the two ends of the linear actuator to decrease.

In one example, the braking force generated by the braking system may increase when the linear actuator moves from the first retracted position toward the extended position, or the braking force generated by the braking system may decrease when the linear actuator moves from the first retracted position toward the extended position.

In a further aspect, the following invention relates to a vehicle. This vehicle may comprise:
  an electrical energy supply means 106;
  an electro-mechanical braking system 102 for at least one vehicle according to any one of the embodiments described above.

The vehicle preferably comprises at least one railway vehicle.

The vehicle is preferably a railway train.

The resulting advantage is therefore that of having provided a solution that makes it possible to monitor the residual capacitance of at least a first super-capacitor of an electro-mechanical braking system of at least one vehicle without temporarily compromising the ability to perform emergency safety braking.

This invention may preferably be applicable to any type of vehicle. This may include, for example, railway vehicles/trains, a car, a truck (for example a highway semi-trailer truck, a mining truck, a truck for transporting timber or the like) or the like, and the route may be a track, a road or a trail.

Various aspects and embodiments of at least a first super-capacitor of an electro-mechanical braking system of at least one vehicle, an electro-mechanical braking system, and a vehicle comprising this electro-mechanical braking system according to the invention have been described. It is understood that each embodiment may be combined with any other embodiment. Moreover, the invention is not limited to the embodiments described, but may be varied within the scope defined by the appended claims.

The invention claimed is:

1. A method for determining a capacitance value of at least a first super-capacitor of an electro-mechanical braking system of at least one vehicle, wherein said electro-mechanical braking system further includes a second super-capacitor;
  wherein said first super-capacitor is arranged to store a first amount of electrical energy sufficient to cause the electro-mechanical braking system to perform at least one emergency braking action and said second super-capacitor is arranged to store a second amount of electrical energy sufficient to cause the electro-mechanical braking system to perform said at least one emergency braking action;
  wherein said method comprises the steps of:
    a) measuring a first voltage value at terminals of said second super-capacitor;
    b) if said first voltage value is greater than a predetermined minimum voltage value, performing a charge or discharge action of said first super-capacitor for a first measurement time period, wherein said charge or discharge action is arranged to make said terminals of said first super-capacitor assume a second voltage value;

c) determining a first voltage variation at the terminals of said first super-capacitor during said first measurement time period;
d) determining a first voltage variation rate on the basis of the first voltage variation at the terminals of said first super-capacitor determined in step c) and a time duration of said first measurement time period;
e) measuring a first current value flowing in one of said terminals of said first super-capacitor, at a first measurement instant of said first measurement time period;
f) calculating the capacitance value of said first super-capacitor by means of the ratio between said first current value measured at said first measurement instant and said first voltage variation rate.

2. The method for determining a capacitance value of the at least a first super-capacitor according to claim 1, wherein step a) is performed when the second super-capacitor is not undergoing a charge action.

3. The method for determining a capacitance value of at least a first super-capacitor according to claim 1, wherein step d) comprises:
determining the first voltage variation rate by means of the ratio between the first voltage variation determined in step c) and said duration of time of said first measurement time period.

4. The method for determining a capacitance value of at least a first super-capacitor according to claim 1, further comprising the steps of:
a') measuring a third voltage value at terminals of said first super-capacitor;
b') if said third voltage value is higher than said predetermined minimum voltage value, performing a charge or discharge action of said second super-capacitor for a second measurement time period, wherein said charge or discharge action is arranged to make said terminals of said second super-capacitor assume a fourth voltage value;
c') determining a second voltage variation at the terminals of said second super-capacitor (101) during said second measurement time period;
d') determining a second voltage variation rate on the basis of the second voltage variation at the terminals of said second super-capacitor determined in step c') and a duration of time of said second measurement time period;
e') measuring a second current value flowing in one of said terminals of said second super-capacitor, at a second measurement instant of said second measurement time period;
f') calculating the capacitance value of said second super-capacitor by means of the ratio between said second current value measured at said second measurement instant and said second voltage variation rate.

5. The method for determining a capacitance value of at least a first super-capacitor according to claim 4, wherein step a') is performed when the first super-capacitor is not undergoing a charge action.

6. The method for determining a capacitance value of at least a first super-capacitor according to claim 4, wherein step d') comprises:
determining the second voltage variation rate by means of the ratio between the second voltage variation determined in step c') and said duration of time of said second measurement time period.

7. The method for determining a capacitance value of the at least a first super-capacitor according to claim 4, wherein:
said first measurement time period and said second measurement time period are equal.

8. The method for determining a capacitance value of at least a first super-capacitor according to claim 1, further comprising the step of:
comparing the calculated capacitance value of said first super-capacitor with a first predetermined minimum capacitance threshold.

9. The method for determining a capacitance value of at least a first super-capacitor according to claim 8, wherein, when the comparison shows that the calculated capacitance value of said first super-capacitor is less than said first predetermined minimum capacitance threshold, the method further comprises the step of:
sending a first maintenance request or alarm signal to a remote control station; and/or
operating a first signaling means arranged in a control cabin of the vehicle; and/or
transmitting a first error message to a control unit of the vehicle;
preventing the release of the braking force generated by the electro-mechanical braking system.

10. The method for determining a capacitance value of at least a first super-capacitor according to claim 9, further comprising the step of:
comparing the calculated capacitance value of said second super-capacitor with a second predetermined minimum capacitance threshold.

11. The method for determining a capacitance value of at least a first super-capacitor according to claim 10, wherein said first predetermined minimum capacitance threshold and said second predetermined minimum capacitance threshold are equal.

12. The method for determining a capacitance value of at least a first super-capacitor according to claim 10, wherein, when the comparison shows that the calculated capacitance value of said second super-capacitor is less than said second predetermined minimum capacitance threshold, the method further comprises the step of:
sending a second maintenance request or alarm signal to said remote control station; and/or
operating said first signaling means arranged in said control cabin of the vehicle or a second signaling means arranged in said control cabin of the vehicle;
transmitting a second error message to the control unit of the vehicle;
preventing the release of the braking force generated by the electro-mechanical braking system.

13. An electro-mechanical braking system for at least one vehicle, comprising:
a first super-capacitor arranged to store a first amount of electrical energy sufficient to cause the electro-mechanical braking system to perform at least one emergency braking action;
a second super-capacitor arranged to store a second amount of electrical energy sufficient to cause the electro-mechanical braking system to perform said at least one emergency braking action;
a control means arranged to carry out a method for determining a capacitance value of at least a first super-capacitor according to claim 1.

14. The electro-mechanical braking system for at least one vehicle according to claim 13, wherein said electro-mechanical braking system is arranged to receive at least part of a third amount of electrical energy from an electrical energy supply means of said vehicle;

said electro-mechanical braking system further comprising:
- an electro-mechanical actuator arranged to receive electrical energy and convert it into a braking force;
- at least one selection means arranged to receive at least part of the first amount of electrical energy stored in said first super-capacitor, at least part of the second amount of electrical energy stored in said second super-capacitor, and at least part of the third amount of electrical energy stored in said electrical energy supply means, and selectively supply at least part of the first amount of electrical energy stored in said first super-capacitor or at least part of the second amount of electrical energy stored in said second super-capacitor or at least part of the third amount of electrical energy stored in the electrical energy supply means to said electro-mechanical actuator.

15. The electro-mechanical braking system for at least one vehicle according to claim 13, wherein said first super-capacitor and said second super-capacitor are arranged electrically in parallel with each other.

16. The electro-mechanical braking system for at least one vehicle according to claim 14, wherein, when said electro-mechanical braking system receives a request to perform braking, said at least one selection means is arranged to:
- supply to said electro-mechanical actuator at least part of the third amount of electrical energy stored in said electrical energy supply means when the voltage at the terminals of said electrical energy supply means is greater than said minimum voltage value.

17. The electro-mechanical braking system for at least one vehicle according to claim 14, wherein said selection means includes at least:
- a first diode connected between said electrical energy supply means and said electro-mechanical actuator, a second diode connected between said first super-capacitor and said electro-mechanical actuator, and a third diode connected between said second super-capacitor and said electro-mechanical actuator; or
- a first switching means connected between said electrical energy supply means and said electro-mechanical actuator, a second switching means connected between said first super-capacitor and said electro-mechanical actuator, and a third switching means connected between said second super-capacitor and said electro-mechanical actuator.

18. The electro-mechanical braking system for at least one vehicle according to claim 13, wherein said control means is arranged to carry out a method for determining a capacitance value of at least a first super-capacitor comprising:
- a communication means arranged to send said first maintenance request or alarm signal to a remote control station and/or said second maintenance request or alarm signal to a remote control station and/or said first error message to the control unit of the vehicle and/or said second error message to the control unit of the vehicle; and/or
- at least a first signaling means arranged in a control cabin of the vehicle; and/or
- a means for preventing the release of the braking force generated by the electro-mechanical braking system.

19. The electro-mechanical braking system for at least one vehicle according to claim 14, wherein the control means is arranged to receive a signal indicative of the voltage value at terminals of said electrical energy supply means;
- wherein, when the signal indicative of the voltage value at terminals of said electrical energy supply means indicates a voltage value at the terminals of said electrical energy supply means that is less than said minimum voltage value, the control means is also arranged to, via the selection means:
- provide said electro-mechanical actuator with at least part of the first amount of electrical energy stored in said first super-capacitor in order to apply automatic emergency braking; and/or
- provide said electro-mechanical actuator with at least part of the second amount of electrical energy stored in said second super-capacitor in order to apply automatic emergency braking.

20. A vehicle comprising:
- an electrical energy supply means;
- an electro-mechanical braking system for at least one vehicle according to claim 13.

* * * * *